(12) United States Patent
Mertz (10) Patent No.: US 8,135,279 B2
(45) Date of Patent: Mar. 13, 2012

(54) OFDM DIRECT DETECTION USING A BALANCED RECEIVER

(75) Inventor: Pierre Mertz, Baltimore, MD (US)

(73) Assignee: Infinera Corporation, Sunnyvale, CA (US)

( * ) Notice: Subject to any disclaimer, the term of this patent is extended or adjusted under 35 U.S.C. 154(b) by 829 days.

(21) Appl. No.: 12/239,921

(22) Filed: Sep. 29, 2008

(65) Prior Publication Data

US 2010/0080560 A1  Apr. 1, 2010

(51) Int. Cl.
*H04J 4/00* (2006.01)
*H04B 10/06* (2006.01)

(52) U.S. Cl. .......................... 398/76; 398/202
(58) Field of Classification Search ............. 398/76, 398/202
See application file for complete search history.

(56) References Cited

PUBLICATIONS

Lowery et al., "Performance of optical OFDM in ultralong-haul WDM lightwave systems," IEEE Journal of Lightwave Technology, vol. 25, No. 1, Jan. 2007, pp. 131-138.
Shieh et al., "Theoretical and experimental study on PMD supported transmission using polarization diversity in conherent optical OFDM systems," Optics Express, vol. 15, No. 16, Aug. 6, 2007, 9936-9947.
Jansen et al., "Experimental demonsation of 23.6-Gb/s OFDM with a coloreless transmitter," OECC 2007, PD1-5.
Djordjevic et al., "Orthogonal frequency division multiplexing for high-speed optical transmission," Optical Epress, vol. 14, No. 9, May 1, 2006, pp. 3767-3775.
Lowery, "Fiber nonlinearlity pre- and post-compensation for long-haul optical links using OFDM," Optics Express, vol. 15, No. 20, Oct. 1, 2007, pp. 12965-12970.
Bulow et al., "40 Gb/s distortion mitigation and DSP-based equalization," ECOC 2007, 3-1-1.
Jansen et al., "10-Gb/s OFDM with conventional DFB lasers," ECOC 2007, 5-2-2.
Lowery, "Improving sensitivity and spectral efficiency in direct-detection optical OFDM systems," OFC/NFOEC 2008, OMM4.
Armstrong, "OFDM for Optical Communications," IEEE Journal of Lightwave Technology, vol. 27, No. 3, Feb. 1, 2009, pp. 189-204.

*Primary Examiner* — Armando Rodriguez
(74) *Attorney, Agent, or Firm* — Harrity & Harrity, LLP; David L. Soltz (57) ABSTRACT

A receiver for demodulating optical OFDM signals may detect an optical OFDM signal that includes a carrier and data subcarriers by optically splitting the carrier from the subcarriers using a frequency selective filter and then recombining the carrier and the subcarriers using an optical coupler and balanced detector.

14 Claims, 12 Drawing Sheets

OFDM DIRECT DETECTION USING A BALANCED RECEIVER

BACKGROUND

High capacity networks are frequently constructed using optical links. Each optical link may include one or more optical fibers through which optical signals are transmitted. The light transmitted through the fibers is controlled in such a way as to communicate desired information.

Orthogonal Frequency Division Multiplexing (OFDM) is a frequency division multiplexing scheme that has recently been applied to optical networks to obtain high bandwidth optical communication. In general, an OFDM signal is composed of a number of closely spaced and partially overlapping subcarriers. The data is divided into several parallel data streams or channels, one for each subcarrier. Each subcarrier may be modulated with a conventional modulation scheme at a relatively low symbol rate, thereby maintaining the total data rate at a level comparable to single-carrier modulation schemes in the same bandwidth.

Figure 1:
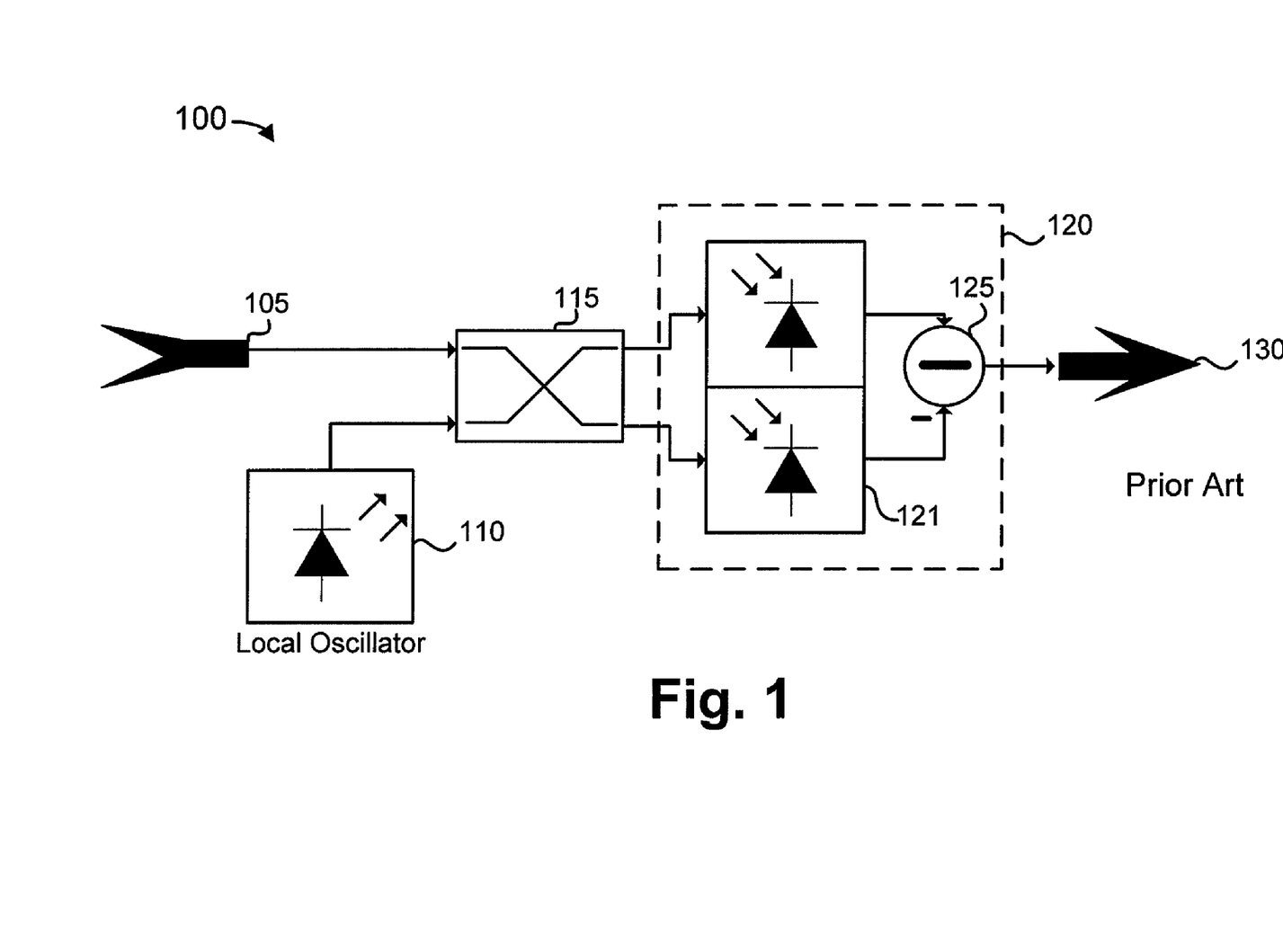
FIG. 1 is a diagram illustrating a conventional receiver for demodulating optical OFDM signals using a coherent detection technique.

FIG. 1 is a diagram illustrating a conventional receiver 100 for demodulating optical OFDM signals using a coherent detection technique. Receiver 100 may implement coherent signal detection, meaning that the carrier is removed from the received signal and a local oscillator is used to regenerate the carrier at the receiver.

As shown in FIG. 1, receiver 100 includes a local oscillator 110, a 2×2 optical coupler 115, a balanced detector 120 (which includes matched photodiodes 120 and a differential amplifier 125). Input signal 105 and the output of local oscillator 110 are input to 2×2 optical coupler 115. The outputs of optical coupler 115 are transmitted to balanced detector 120.

Local oscillator 110 may include a laser that generates an optical signal that is matched to the optical signal used by the transmitter (i.e., the transmitter of the optical signal received by receiver 100). Local oscillator 110 is used in coherent detection because the carrier in input signal 105 is removed by the transmitter before transmitting the signal over the optical channel. In practice the frequency of local oscillator 110 may not be perfectly matched to the oscillator used for transmission and additionally, local oscillator 110 may include a non-zero line width that introduces phase noise into the system.

Optical coupler 115 may act to optically mix (interfere) its two input optical signals to generate output signals in which the signal from local oscillator 110 is mixed with input signal 105. One arm contains the sum of the two optical signals and one arm contains the difference of the two optical signals. Matched photodiodes 121 of balanced detector 120 may receive its two input optical signals and produce voltages proportional to the square of the electric field of the input optical signals. Differential amplifier 125 subtracts the signals output from matched photodiodes 120 to obtain electrical signal 130, which can be processed to recover the transmitted (desired) information. More particularly, signal 130 may subsequently be converted to the digital domain by an analog-to-digital converter and then processed using signal processing techniques to obtain the desired information.

Advantages of receiver 100 include: (1) that the OFDM signal is optically power efficient on the transmission line since it only contains the data carrying subcarriers, and (2) that groups of subcarriers can be closely spaced to local oscillator 100 since subcarrier mixing products are suppressed by balanced detector 120. The disadvantages of receiver 100, however, include: (1) that local oscillator is 110 required at the receiver, 2) both local oscillator 110 and the laser at the transmitter should have narrow line widths since OFDM is sensitive to phase noise, and 3) significant processing effort and bandwidth in the form of pilot tones may be required for phase estimation.

Figure 2:
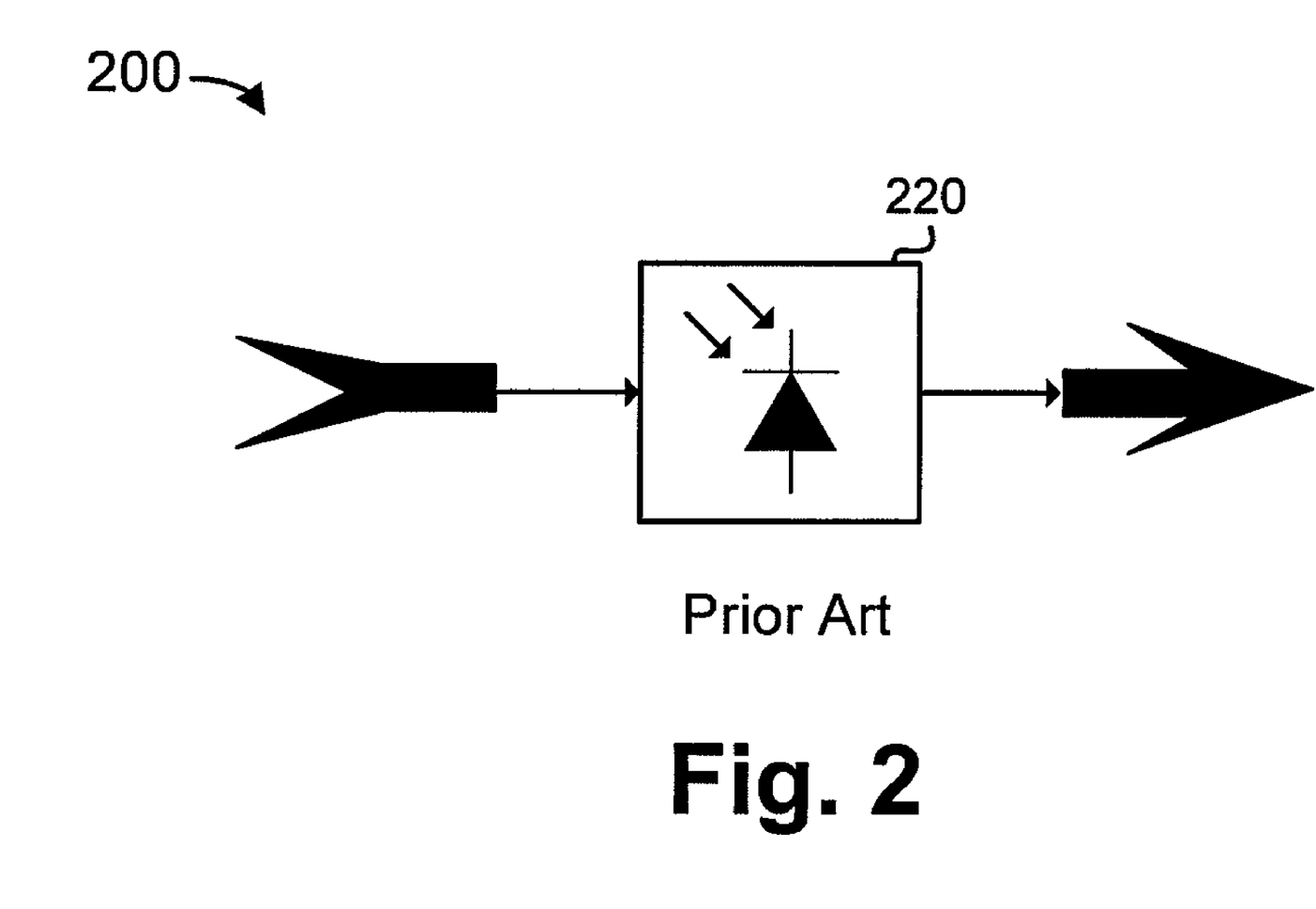
FIG. 2 is a diagram illustrating a second conventional receiver for demodulating optical OFDM signals using a direct detection technique.

FIG. 2 is a diagram illustrating another conventional receiver 200 for demodulating optical OFDM signals. Receiver 200 may implement direct signal detection, meaning that the carrier is transmitted along with the subcarriers.

Receiver 200 includes a single ended detector 220 that converts its input optical signal into an electrical signal. The advantages of direct detection include: (1) a relatively simple configuration of receiver 200 and (2) tolerance to high line width lasers since the phase of the laser is in the carrier. The disadvantages of receiver 200, however, can include: (1) optical power efficiency is halved since typically the carrier contains the same power as all of the subcarriers combined, and (2) spectral efficiency is reduced relative to coherent detection because detector 220 generates subcarrier mixing products that require a group of subcarriers to be sufficiently separated from the carrier so that the mixing products do not interfere with the subcarriers.

Figure 3:
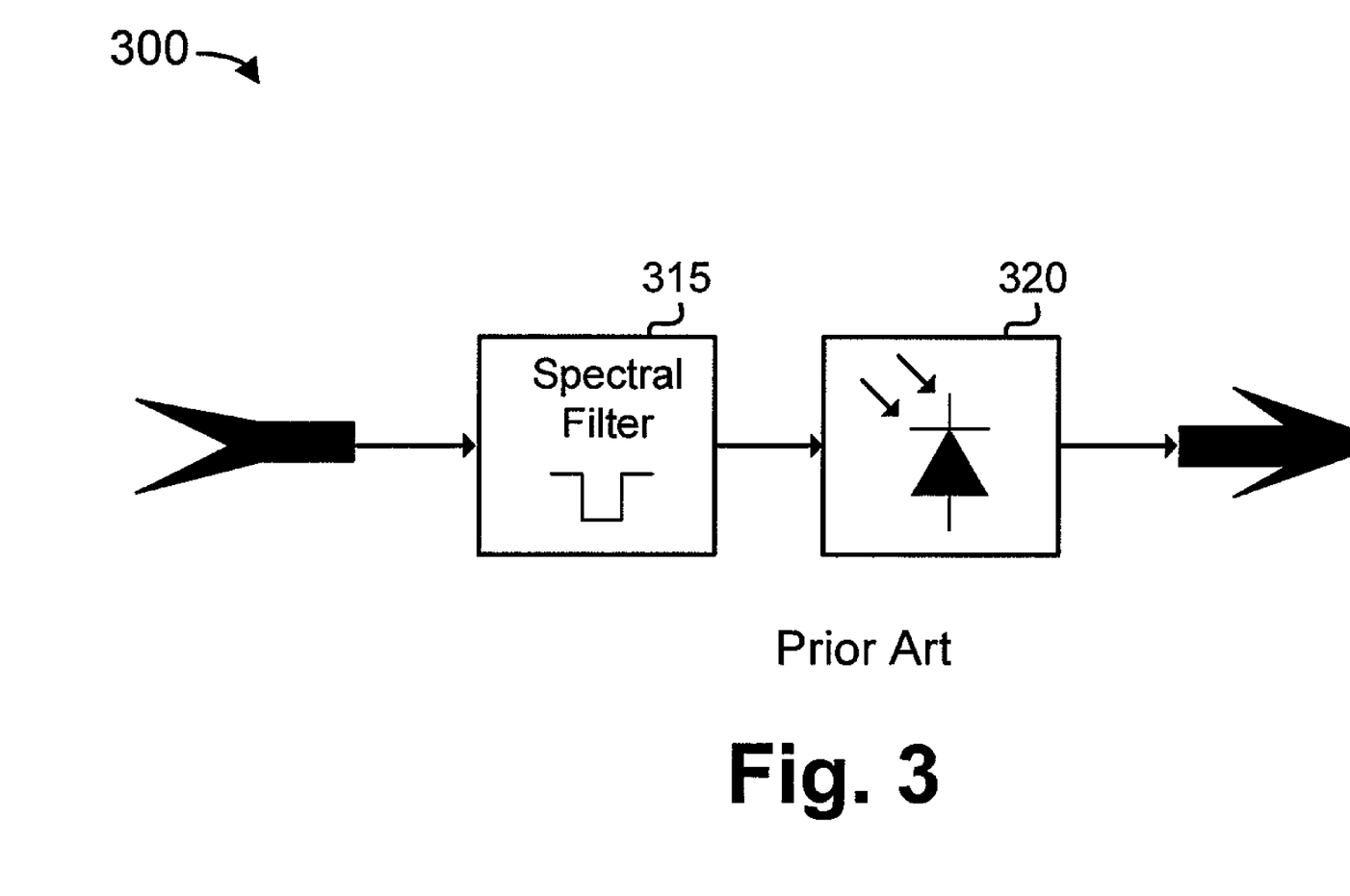
FIG. 3 is a diagram illustrating a third conventional receiver for demodulating optical OFDM signals using a direct detection technique.

FIG. 3 is a diagram illustrating another conventional receiver 300 for demodulating optical OFDM signals. Receiver 300 is similar to receiver 200 in that both implement direct detection. Additionally, receiver 300 includes a spectral filter.

More particularly, as shown in FIG. 3, receiver 300 includes a spectral filter 315 in front of a single ended detector 320. Spectral filters selectively transmit optical signals according to wavelength. Spectral filter 315 may particularly operate to attenuate the signal subcarriers with respect to the carrier. The effect is to reduce the subcarrier mixing products generated by detector 320 as compared to the desired products between the carrier and the subcarriers.

The advantages of receiver 300 include: (1) tolerance to high line width lasers, 2) spectral efficiency since the reduction of the subcarrier mixing products allows the subcarriers to be moved closer to the carrier, and 3) optical power efficiency in the line since the carrier power can be reduced to a fraction of the total subcarrier power. The disadvantages of receiver 300, however, include: (1) an optical amplifier may be required at the receiver to boost the line's reduced carrier to a high optical power; (2) the attenuation of the subcarriers from their amplified levels can mean power is wasted in the amplifier; (3) subcarrier mixing products are reduced, but not completely suppressed; (4) the carrier noise products can be high relative to the subcarriers, requiring further RF spectral filtering; and (5) if the signal is not amplified enough, thermal noise in detector 320 can limit the signal-to-noise ratio (SNR).

The conventional OFDM receivers described with respect to FIGS. 1-3 each has advantages and disadvantages. It can be appreciated that, when using OFDM, it is desirable to use the most bandwidth maximizing and/or efficient receiver as possible.

SUMMARY

In accordance with one implementation, an optical receiver may include an optical filter having an input and first and second outputs, the input being configured to receive an input optical signal, which includes a carrier and subcarriers, the optical filter supplying a first output optical signal including the carrier at the first output and a second output optical signal including the subcarriers at the second output, the carrier having a first frequency, and each of the subcarriers having a corresponding one of a number of second frequencies. The receiver additionally includes an optical coupler having first and second inputs and first and second outputs, the first input of the optical coupler being configured to receive the first output optical signal and the second input of the optical coupler being configured to receive the second output optical signal, a third output optical signal being supplied from the first output of the optical coupler and a fourth output optical signal being supplied from the second output of the optical coupler. The receiver additionally includes a first photodetector configured to receive the third output optical signal and generate a first electrical signal in response to the third output optical signal and a second photodetector configured to receive the fourth output optical signal and generate a second electrical signal in response to the fourth output optical signal.

In another implementation, an optical receiver may include an optical filter having an input and first and second outputs, the input being configured to receive an input optical signal, which includes a carrier and subcarriers, the optical filter supplying a first output optical signal including the carrier at the first output and a second output optical signal including the subcarriers at the second output, the carrier having a first frequency, and each of the subcarriers having a corresponding one of a plurality of second frequencies. The receiver may additionally include a 90 degree optical hybrid component connected to receive the first optical output signal and the second optical output signal and supply third, fourth, fifth, and sixth optical output signals. Still further, the receiver may include a first photodetector configured to receive the third optical output signal and generate a first electrical signal in response; a second photodetector configured to receive the fourth optical output signal and generate a second electrical signal in response; a third photodetector configured to receive the fifth optical output signal and generate a third electrical signal in response; and a fourth photodetector configured to receive the sixth optical output signal and generate a fourth electrical signal in response.

In another implementation, an optical receiver may include an optical filter to receive an input optical signal and to output a plurality of groups of optical signals, each group including a carrier and subcarriers; and a plurality of partial receiver components, where each of the partial receiver components receives at least one group of optical signals. Each of the partial receiver components may include: an optical coupler connected to receive the carrier and the subcarriers of the at least one group of optical signals, and a pair of photodetectors, connected to outputs of the optical coupler, the pair of photodetectors generating electrical signals containing the subcarriers in a format suitable for recovering the data.

In yet another implementation, a method may include receiving an optical signal that contains data, the optical signal including a carrier and a plurality of subcarriers; optically separating the carrier from the plurality of subcarriers using an optical filter that separates signals based on frequency; optically coupling the separated carrier and the plurality of subcarriers to obtain first and second optical signals that are out-of-phase relative to one another; generating an electrical signal from the first and second optical signals; digitizing the electrical signal; and processing the digitized electrical signal to recover the data.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers may be used in different drawings to identify the same or similar elements. Also, the following detailed description does not limit the invention. Instead, the scope of the invention is defined by the appended claims and equivalents.

Embodiments described here relate to receivers for demodulating optical OFDM signals. The receivers may detect an optical OFDM signal that includes a carrier and data subcarriers by optically splitting the carrier from the subcarriers using a frequency selective filter and then recombining the carrier and the subcarriers using a frequency unselective optical coupler. The described receivers can provide relatively good tolerance to high line width lasers, spectral efficiency, and optical power efficiency.

Figure 4:
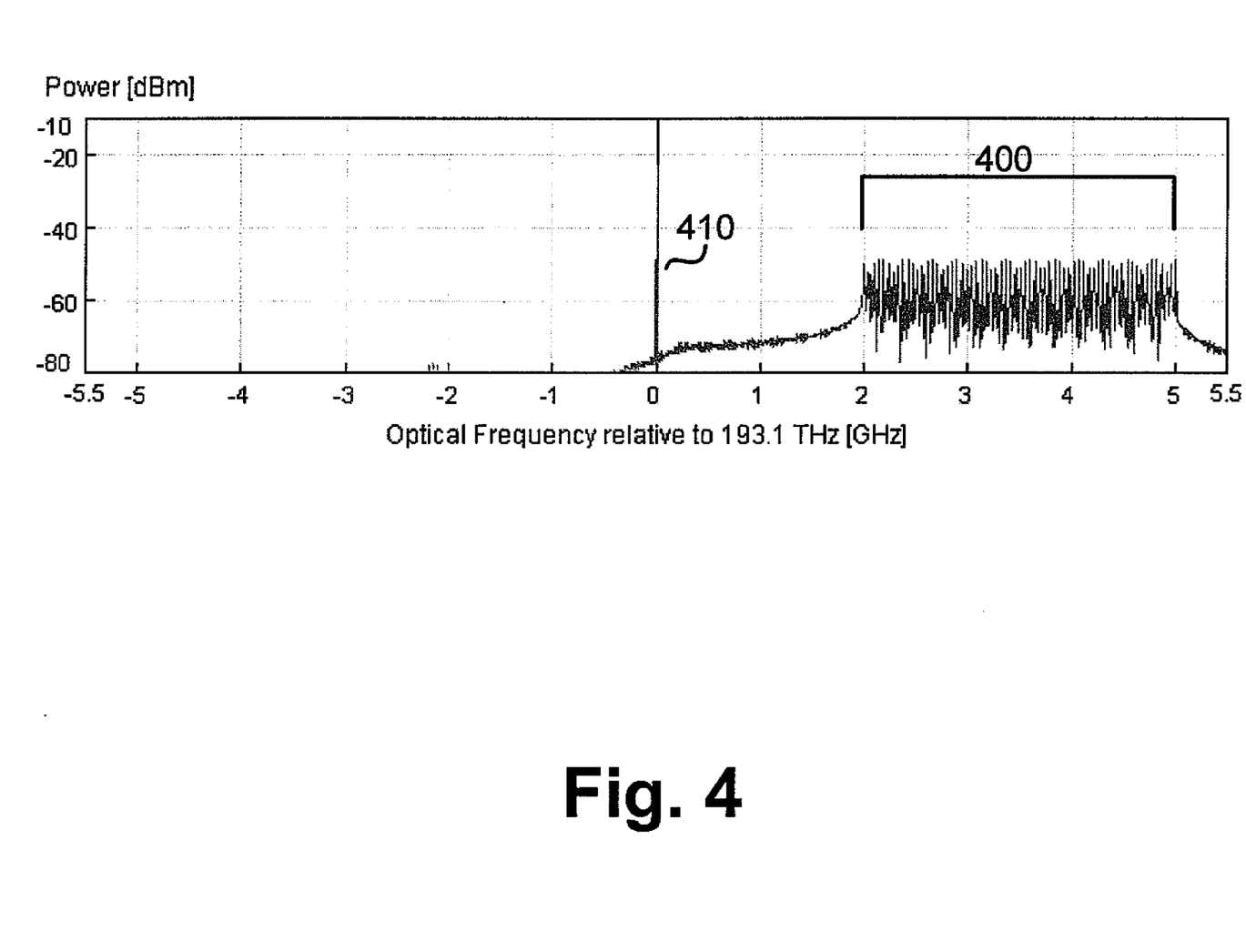
FIG. 4 is a diagram illustrating the frequency spectrum of an exemplary OFDM modulated signal.

FIG. 4 is a diagram illustrating the frequency spectrum of an exemplary OFDM modulated signal. In this example, the information for the signal is carried in 64 sub-carriers 400 that are equally spaced between 2 GHz and 5 GHz (i.e., 3 GHz range) to the right of a carrier 410. The illustrated subcarriers 400 include no data and so are spectrally pure for clarity of the discussion. Although the data signal (subcarriers 400) is spectrally pure, assume it is modulating a distributed feedback (DFB) laser with a line width of 20 MHz. Carrier 410 and sub-carriers 400 may be slightly broadened by the DFB laser.

Figure 5:
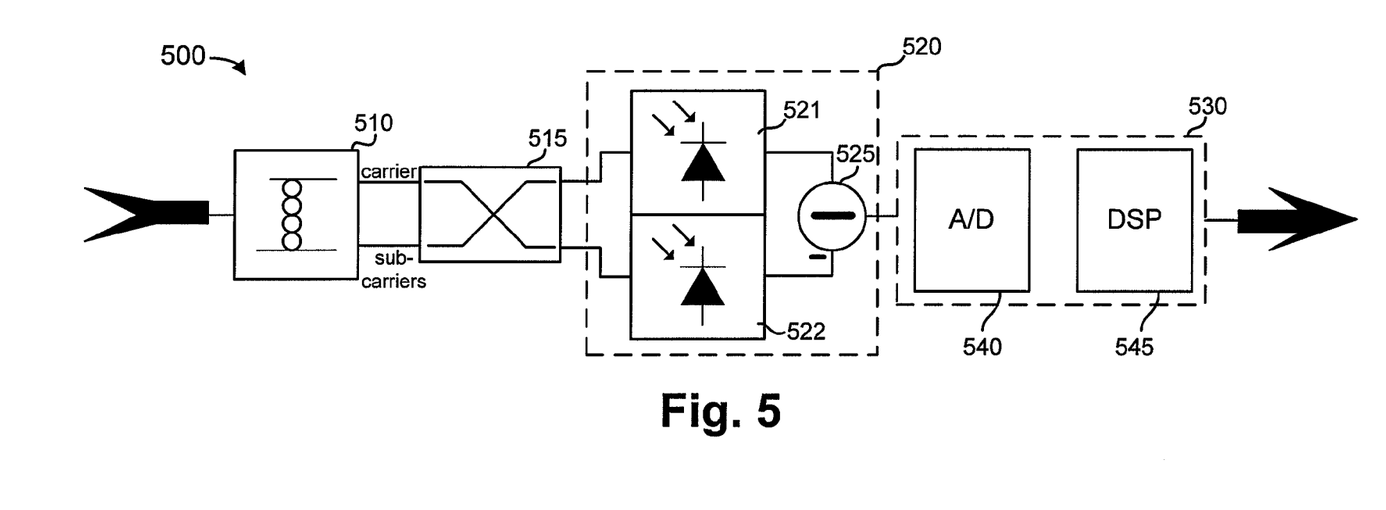
FIG. 5 is a diagram illustrating an exemplary receiver, consistent with aspects described herein, for demodulating optical OFDM signals.

FIG. 5 is a diagram illustrating an exemplary receiver 500, consistent with aspects described herein, for demodulating optical OFDM signals. Receiver 500 may include an optical narrowband filter 510 coupled to a 2×2 optical coupler 515. Optical coupler 515 may be further coupled to a balanced detector 520 that may include matched photodiodes 521 and 521, each coupled to a respective input of a differential amplifier 525. The output of differential amplifier 525 may be digitally processed by digital processing component 530 to recover the transmitted data. The optical signal input to optical narrowband filter 510 may include both the carrier and subcarrier components.

Optical narrowband filter 510 may be implemented as a cascaded ring narrowband filter (or another type of narrowband filter) that filters the carrier onto one waveguide and the subcarriers on to another waveguide. The separated carrier and subcarriers are illustrated in FIG. 5 with the carrier on the upper line and the subcarriers on the lower line emanating from optical narrowband filter 510. Optical coupler 515 may act to optically mix (interfere) the optical field from the carrier with the optical field from the subcarriers to generate output signals in which the carrier is mixed with the subcarriers where one arm contains the sum of the input optical signals and one arm contains the difference of the optical signals. More particularly, if the input fields to optical coupler 515 are denoted as $E_{carrier}$ and $E_{subcarriers}$, then a first output of optical coupler 515 may be ($E_{carrier}+E_{subcarrier}$) and a second output of optical coupler 515 may be ($E_{carrier}-E_{subcarriers}$). In one implementation, optical coupler 515 may be frequency unselective.

In one implementation, optical narrowband filter 510 and optical coupler 515 are implemented using planar lightwave circuit (PLC) technology. Other technologies could alternatively be used, such as one based on optical fiber gratings.

Balanced detector 520, which includes matched photodiodes 521 and 522 and differential amplifier 525, may receive the input optical signals from optical coupler 515 and produce an electrical signal proportional to the intensities of the input optical signals. The balanced detector may tend to suppress the subcarrier mixing products, the carrier noise products, and the subcarrier noise products. Balanced detector 520 may particularly be implemented using two photodetectors, labeled as photodetectors 521 and 522.

Regarding the operation of balanced detector, each photodiode 521 and 522 may operate as a square law detector, meaning that each photodiode generates an electrical signal proportional to the intensity of the input optical signal, which is the square of the optical field. Photodiode 521 may particularly output an electrical signal equal to: $E_{carrier}*E_{carrier}+2*E_{carrier}*E_{subcarrier}+E_{subcarrier}*E_{subcarrier}$, where "*" is the multiplication operator. Photodiode 522 may output an electrical signal equal to: $E_{carrier}*E_{carrier}-2*E_{carrier}*E_{subcarrier}+E_{subcarrier}*E_{subcarrier}$.

Differential amplifier 525 may produce an electrical signal proportional to the difference in the intensities of the input optical signals. From the equations for the output of photodiode 521 and photodiode 522, the difference in the electrical signal is proportional to: $4*E_{carrier}*E_{subcarrier}$. In this manner, balanced detector 520 operates to remove the subcarrier mixing products ($E_{subcarrier}*E_{subcarrier}$) to obtain an electrical signal which can be digitally processed to obtain the transmitted data.

The output from balanced detector 520 may be input to digital processing component 530. Digital processing component 530 may process the electrical signal to obtain the transmitted data. In one implementation, digital processing component 530 may include an analog-to-digital converter (A/D) 540 and one or more digital signal processors (DSPs) 545. A/D 540 may convert the input electrical signal into a digital format which may be processed by DSP 545 to obtain the transmitted data.

Figure 6:
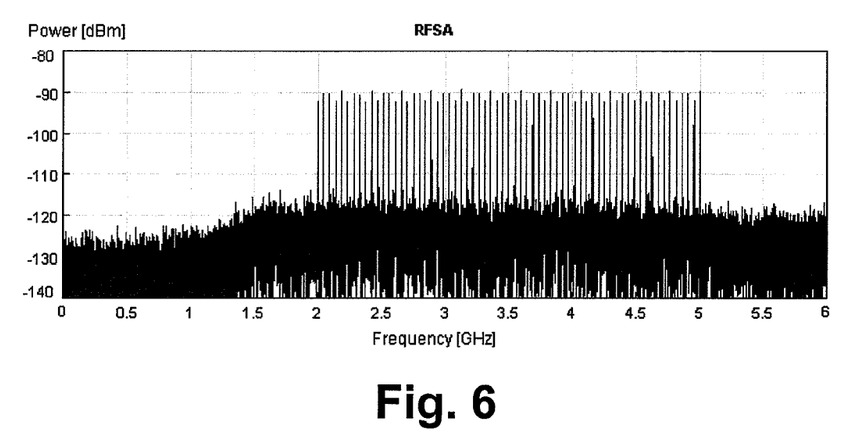
FIG. 6 is a diagram illustrating an exemplary electrical radio frequency (RF) spectrum of a signal before processing by a digital processing component.

FIG. 6 is a diagram illustrating an exemplary electrical radio frequency (RF) spectrum of the signal before processing by digital processing component 530. In FIG. 6, the subcarriers are located within the range 2-5 GHz. The subcarriers in this range are shown as clearly defined individual peaks. In other words, the subcarriers in this range are shown as spectrally pure subcarriers with high SNR and with suppressed subcarrier mixing products and carrier noise products.

Receiver 500 may derive a number of beneficial results relative to the prior art receivers shown in FIGS. 1-3. More particularly, the advantages may include both the advantages of coherent detection (FIG. 1) and direct detection (FIGS. 2 and 3) while avoiding the disadvantages. These advantages may include: (1) tolerance to high line width lasers, (2) spectral efficiency since the suppression of subcarrier mixing products allows the subcarriers to be moved closer to the carrier, and (3) optical power efficiency in the line since the carrier power can be reduced to a fraction of the total subcarrier power.

Figure 7:
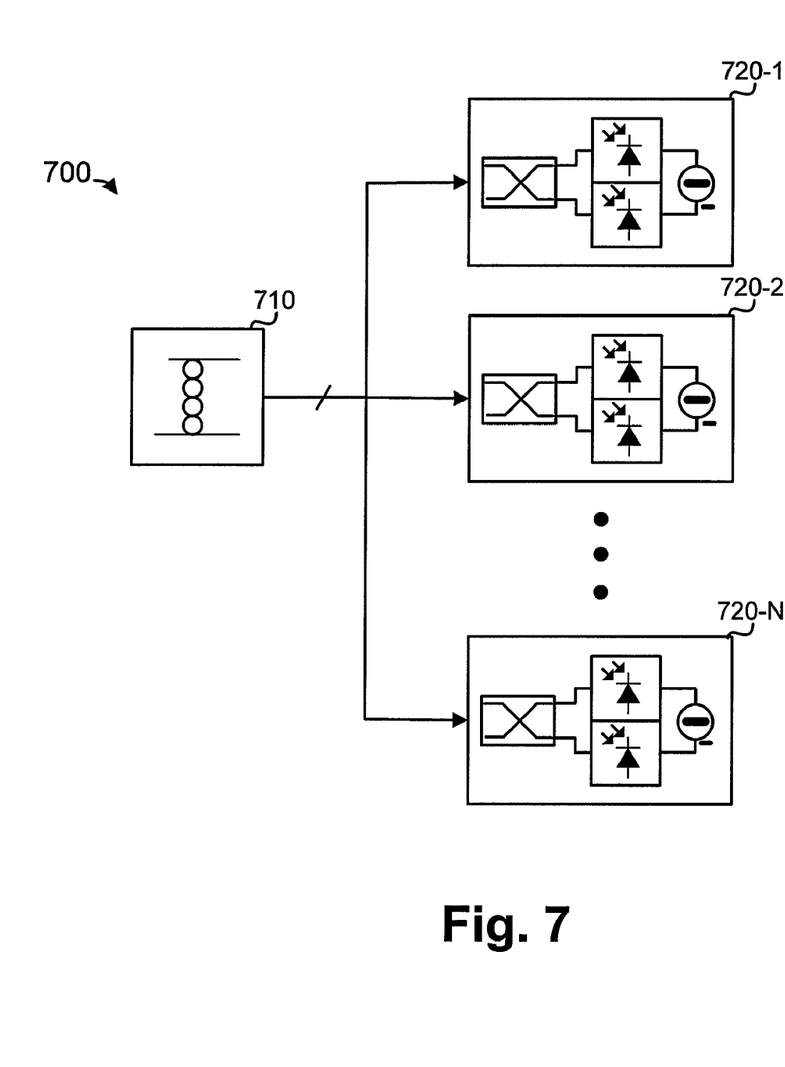
FIG. 7 is a diagram illustrating an alternative implementation of the receiver shown in FIG. 5.

FIG. 7 is a diagram illustrating an alternative implementation of receiver 500, shown as receiver 700. Here, a single optical narrowband filter 710 operates to separate an incoming set of channels into a number of carrier/subcarriers signal sets, each of which may correspond to the carrier/subcarriers shown in FIG. 5. Each such signal set may then be separately processed by a group of components ("partial receiver" components) that include an optical coupler and balanced detector, where each group may be identical to the corresponding components shown in FIG. 5 and is labeled as component groups 720-1 through 720-N in FIG. 7. In this manner, a single optical narrowband filter 710 can be used to filter optical signals for a number of OFDM channels.

Figure 8:
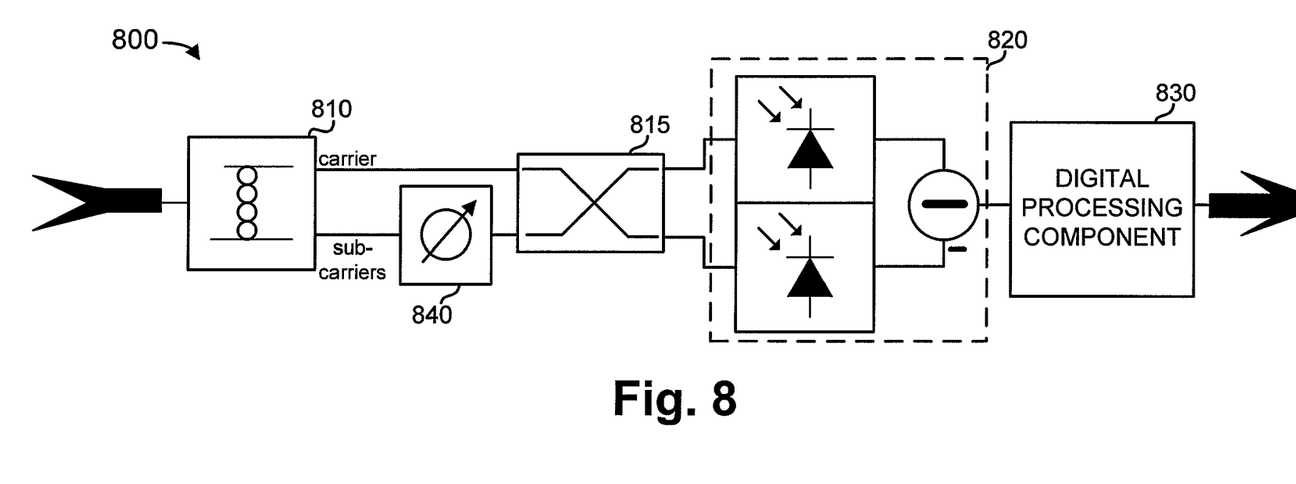
FIG. 8 is a diagram illustrating an exemplary receiver, according to an alternative embodiment, for demodulating OFDM modulated signals.

FIG. 8 is a diagram illustrating an exemplary receiver 800, according to an alternative embodiment, for demodulating OFDM modulated signals. As shown, receiver 800 includes an optical narrowband filter 810 that outputs a carrier and subcarriers. A variable optical attenuator (VOA) 840 receives the subcarriers. A VOA is a known optical component used for attenuating optical signals. The output of VOA 840 and narrowband filter 810 may be received by 2×2 optical coupler 815. The outputs of optical coupler 815 may be transmitted to balanced detector 820. Digital processing component 830 may receive the output of balanced detector 820 and process the signal to obtain the transmitted data.

Many of the components of receiver 800 may be similar to the corresponding components in receiver 500, except that receiver 800 additionally includes VOA 840 in the path of the subcarriers output from narrowband filter 810. If balanced detector 830 is not perfectly balanced, some subcarrier mixing products may remain in the electrical RF spectrum. VOA 840 may operate to reduce these mixing products, potentially resulting in a signal that can be more effectively processed by digital processing component 830. VOA 840 may be set to optimize the output data either by the manufacturer or the end user. In one implementation, VOA 840 may be implemented as a mach zehnder (MZ) interferometer.

Figure 9:
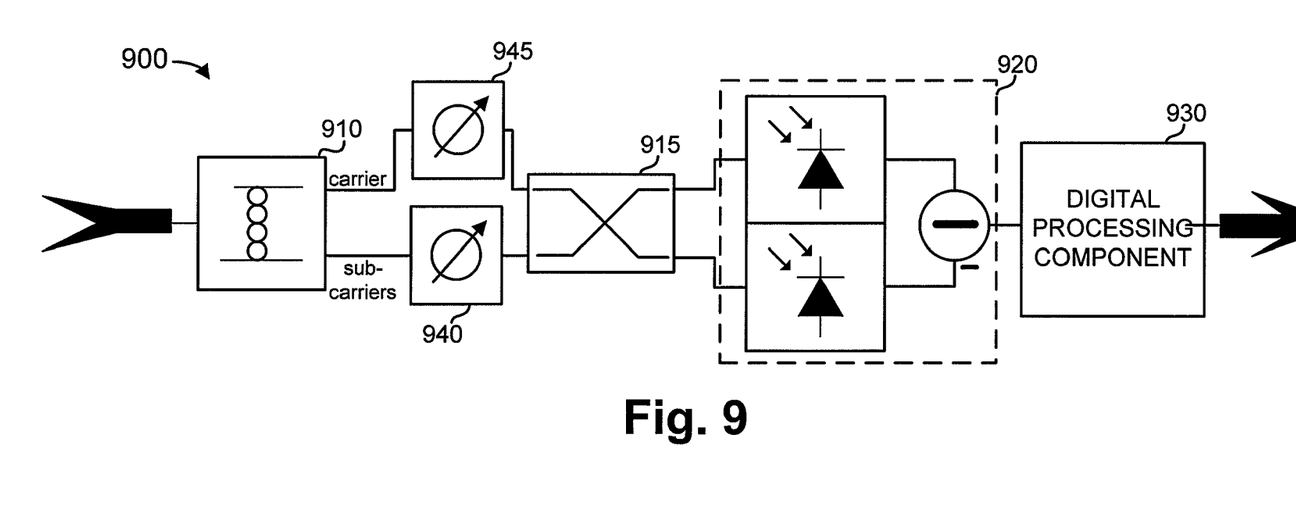
FIG. 9 is a diagram illustrating an exemplary receiver, according to another alternative embodiment, for demodulating OFDM modulated signals.

FIG. 9 is a diagram illustrating an exemplary receiver 900, according to an alternative embodiment, for demodulating OFDM modulated signals. As shown, receiver 900 includes an optical narrowband filter 910 that outputs a carrier and subcarriers. A first VOA 940 receives the subcarriers and a second VOA 945 receives the carrier. The output of VOA 940 and VOA 945 are received by 2×2 optical coupler 915, which is connected to balanced detector 920. Digital processing component 930, which may be implemented in a manner similar to digital processing components 530 and 830, may receive the output of balanced detector 920 and process the signal to obtain the transmitted data.

As can be seen, receiver 900 is similar to receiver 800, except that receiver 900 additionally includes VOA 945 in the path of the carrier. VOA 945 can act to center the subcarriers into the sensitivity range of the photodiodes in balanced detector 920. VOAs 940 and 945 may be optimized to maximize the signal-to-noise ratio (SNR) of balanced detector 920. VOAs 940 and 945 may be set either by the manufacturer or the end user.

In one implementation, VOAs 940 and 945 may be implemented as mach zehnder (MZ) interferometers integrated on the same chip as the spectral filter. In this implementation, insertion losses due to VOAs 940 and 945 may be low or negligible, resulting in little or no loss of power efficiency.

The embodiments described above with respect to FIGS. 5, 8, and 9 were described with respect to a single subcarrier group to the right of the carrier. In practice, the OFDM signal can contain subcarrier groups on both the right and left side of the carrier, in which each subcarrier group contains independent data.

Figure 10:
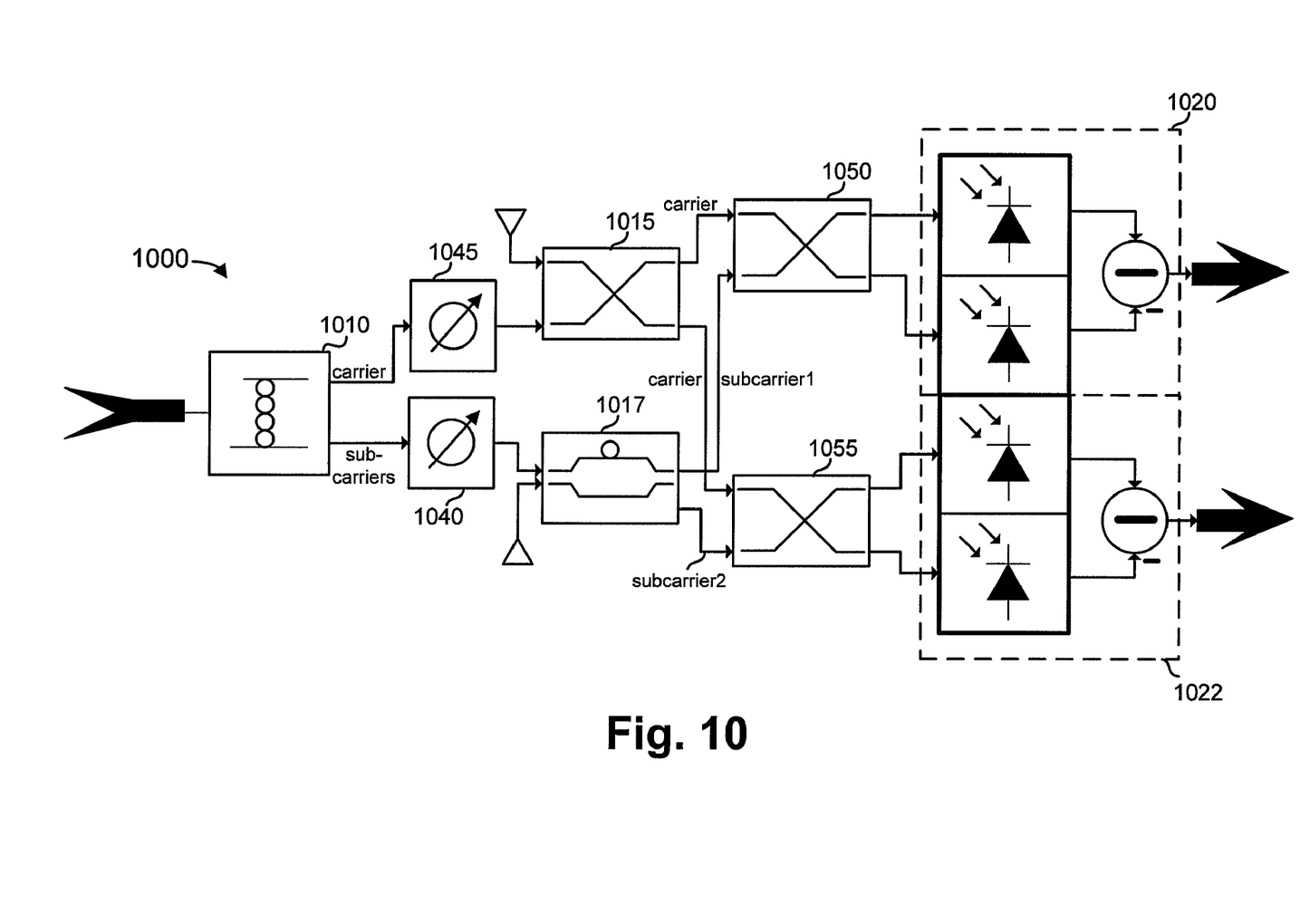
FIG. 10 is a diagram illustrating an exemplary receiver for demodulating OFDM modulated signals that contain subcarrier groups on both the right and left of the carrier.

FIG. 10 is a diagram illustrating an exemplary receiver 1000 for demodulating OFDM modulated signals that contain subcarrier groups on both the right and left of the carrier. As shown, receiver 1000 includes an optical narrowband spectral filter 1010 that outputs a carrier and the subcarriers. Narrowband spectral filter 1010 may output both groups of subcarriers on a single waveguide. VOAs may optionally be used to optimize the results of receiver 1000. As shown, a first VOA 1040 may receive the subcarriers and a second VOA 1045 may receive the carrier. The output of VOA 1040 (the subcarriers) are received by optical filter 1017 and the output of VOA 1045 (the carrier) is received by 2×2 optical coupler 1015.

Optical filter 1017 may be an optical filter designed to split the left and right side subcarriers onto two separate output waveguides. The left and right side subcarriers are labeled as subcarrier1 and subcarrier2 in FIG. 10. Optical coupler 1015 may generate two output carrier signals. Optical filter 1017 and optical coupler 1015 are shown as each including two input ports although the second port for each component is not used (shown with a triangle). It can be appreciated that in some implementations, optical filter 1017 and optical coupler 1015 may be implemented as each including a single input port.

The subcarrier/carrier combinations output from optical filter 1017 and optical coupler 1015 may next be processed as two separate channels by an optical coupler, and balanced detector, as implemented for receiver 500 (FIG. 5). Thus, as shown in FIG. 10, subcarrier1 and the carrier may be processed by optical coupler 1050 and balanced detector 1020. Subcarrier2 and the carrier may be processed by optical coupler 1055 and balanced detector 1022. Digital processing components (not shown in FIG. 10), such as digital processing component 530, may receive the outputs of balanced detectors 1020 and 1022 and process the signals to obtain the transmitted data.

In one implementation, optical narrowband spectral filter 1010 may be implemented using a ring-enhanced asymmetric Mach Zehnder. It could also be implemented as a variety of other spectral demultiplexing filters, such as multiple asymmetric Mach Zehnders in series. Further, the optical components shown in FIG. 10 may be implemented using PLC technology, although other technologies could alternatively be used.

Figure 11:
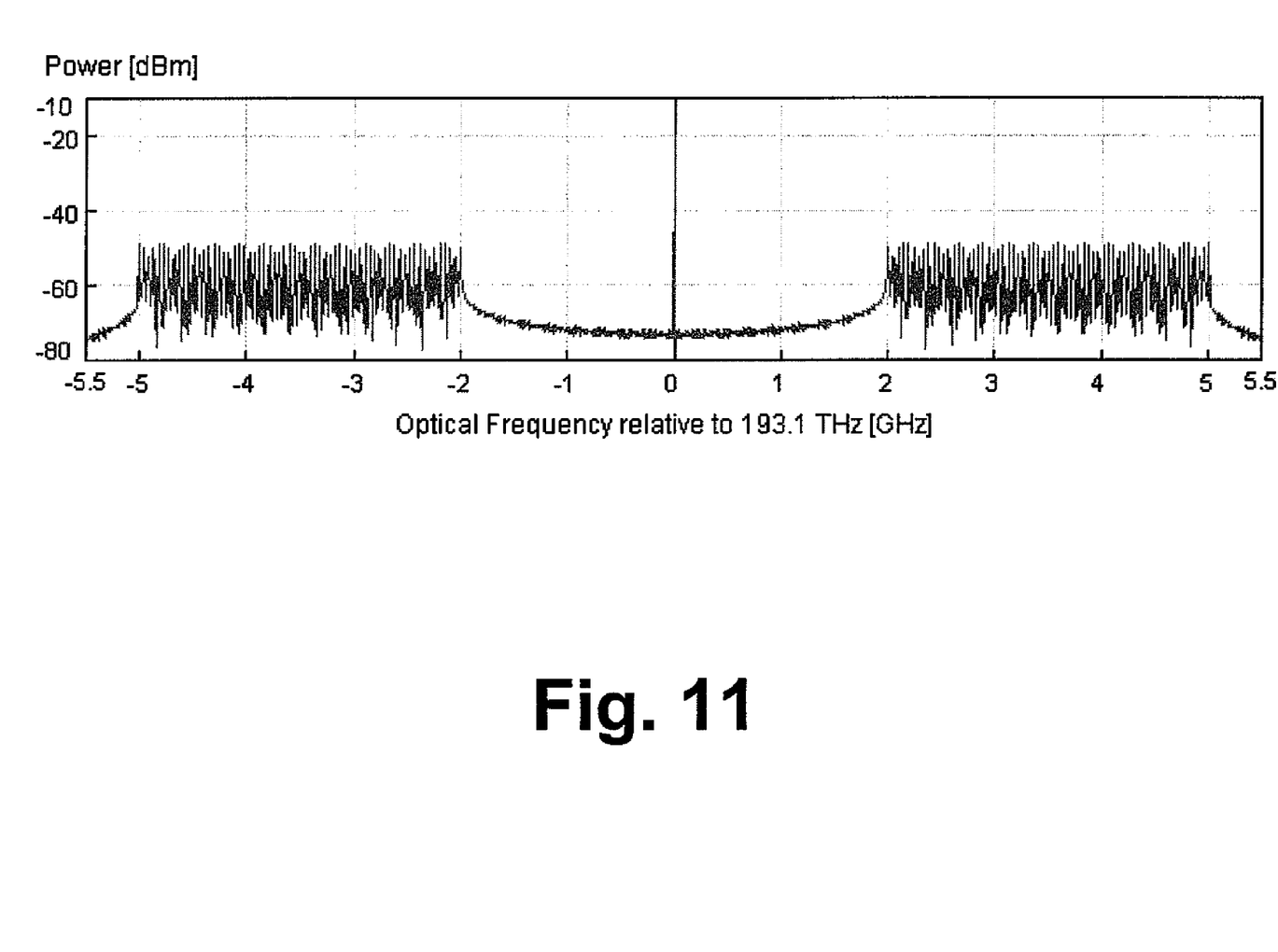
FIG. 11 is a diagram illustrating an exemplary electrical radio frequency (RF) spectrum of the signals output from the receiver shown in FIG. 10.

FIG. 11 is a diagram illustrating an exemplary optical spectrum of the signal input to receiver 1000. As can be seen, the spectrum in FIG. 11 is similar to that of FIG. 4, except that the entire spectrum now contains two subcarrier groups, one from the left subcarrier group and one from the right subcarrier group.

Figure 12:
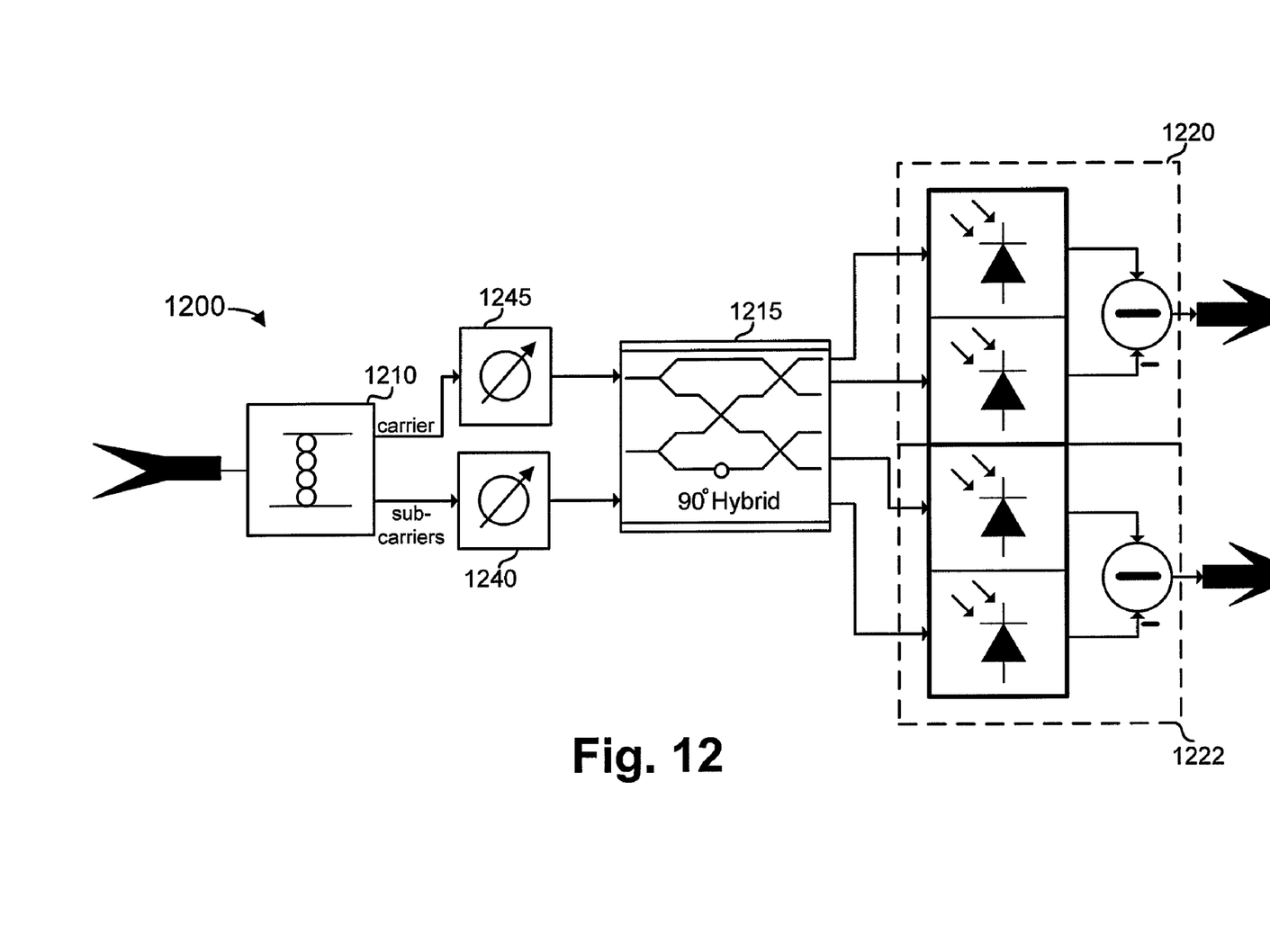
FIG. 12 is a diagram illustrating another exemplary receiver for demodulating OFDM modulated signals that contain subcarrier groups on both the right and left of the carrier.

FIG. 12 is a diagram illustrating another exemplary receiver 1200 for demodulating OFDM modulated signals that contain subcarrier groups on both the right and left of the carrier. As shown, receiver 1200 includes an optical narrowband spectral filter 1210 that outputs a carrier and the subcarriers. Narrowband spectral filter 1210 may output both groups of subcarriers on a single waveguide. VOAs may optionally be used to optimize the results of receiver 1200. As shown, a first VOA 1240 may receive the subcarriers and a second VOA 1245 may receive the carrier. The output of VOA 1240 (the subcarriers) and the output of VOA 1045 (the carrier) may be received by a 90 degree optical hybrid component 1215.

90 degree optical hybrid component 1215 may output two pairs of signals, which are input to balanced detectors 1220 and 1222. A 90 degree optical hybrid is a known optical device for mixing incoming signals with the four quadratural states associated with a reference signal in the complex-field space.

The input to balanced detectors 1220 and 1222 is similar to balanced detectors 1020 and 1022, although it may require different signal processing techniques to recover the transmitted data.

Optical narrowband spectral filter 1210 may be implemented using a ring-enhanced asymmetric Mach Zehnder. It could also be implemented as a variety of other spectral demultiplexing filters, such as multiple asymmetric Mach Zehnders in series. 90 degree optical hybrid component 1215, along with optical narrowband spectral filter 1210 and VOAs 1240 and 1245 may be implemented using PLC technology, although other technologies could alternatively be used.

Figure 13:
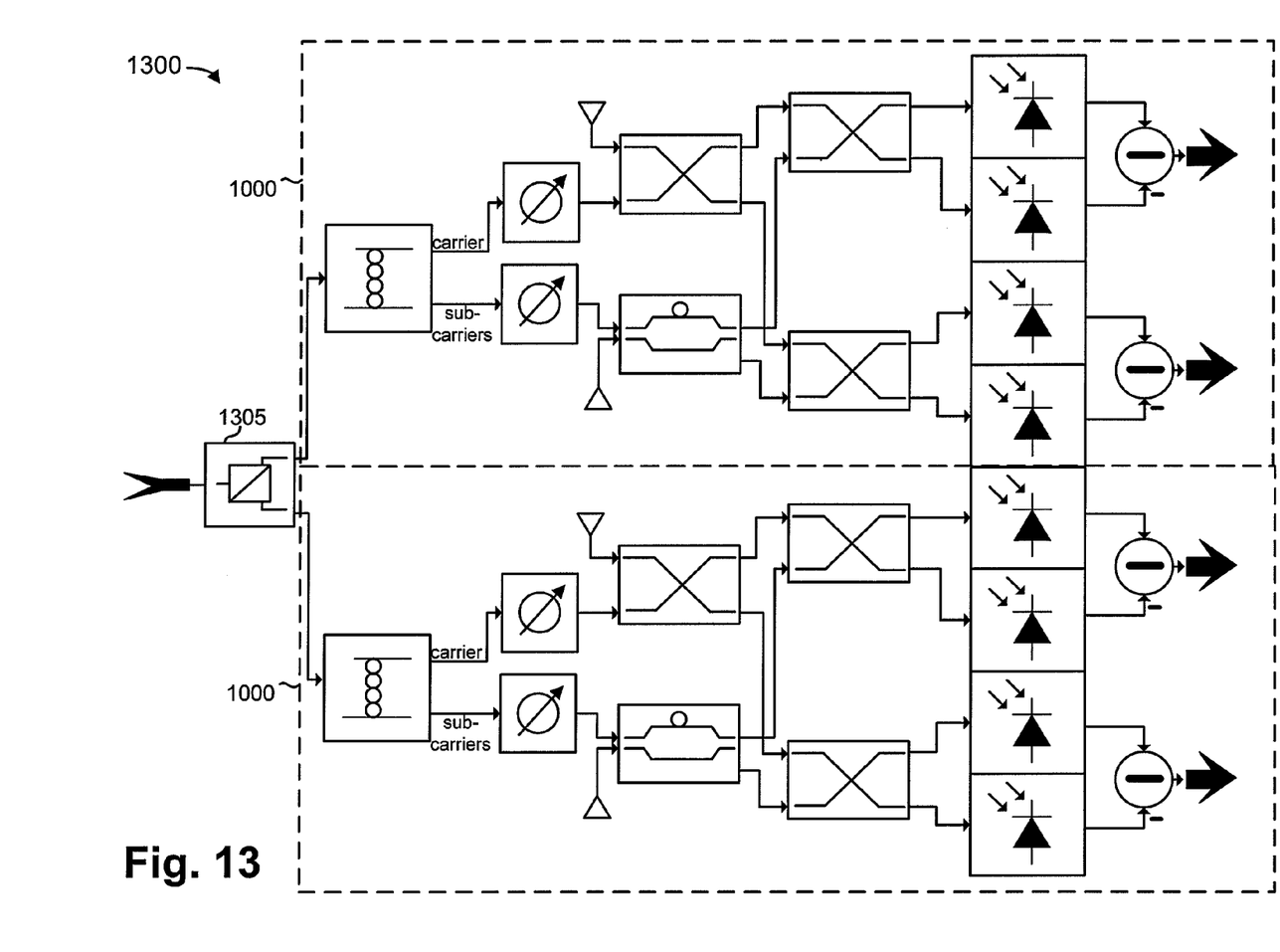
FIG. 13 is a diagram illustrating another exemplary receiver for demodulating OFDM modulated signals that contain subcarrier groups on both the right and left of the carrier.

FIG. 13 is a diagram illustrating another exemplary receiver 1300 for demodulating OFDM modulated signals that contain subcarrier groups on both the right and left of the carrier. Receiver 1300 is a polarization multiplexed receiver using balanced direct detection. As shown, receiver 1300 includes a polarizing beam splitter 1305 in front of two instances of receiver 1000 (FIG. 10). A polarizing beam splitter splits light into different beams based on polarization. It may be possible to achieve additional transmission signal bandwidth using polarization to encode two additional OFDM channels. The output of polarizing beam splitter 1305 may be processed with receivers 1000 as described previously with respect to FIG. 10.

A polarization controller (not shown) may be used with polarizing beam splitter 1305 to align the polarization multiplexed signals to the axes of polarizing beam splitter 1305. Alternatively, receiver 1300 could be implemented without a polarization controller. In this case, the outputs of the balanced receivers may be fed into a multiple-input multiple-output (MIMO) demultiplexer to demultiplex the signals.

In one implementation, polarizing beam splitter 1305 may be implemented using PLC technology along with the other optical components shown in FIG. 13. In other implementations, other technologies could be used.

Figure 14:
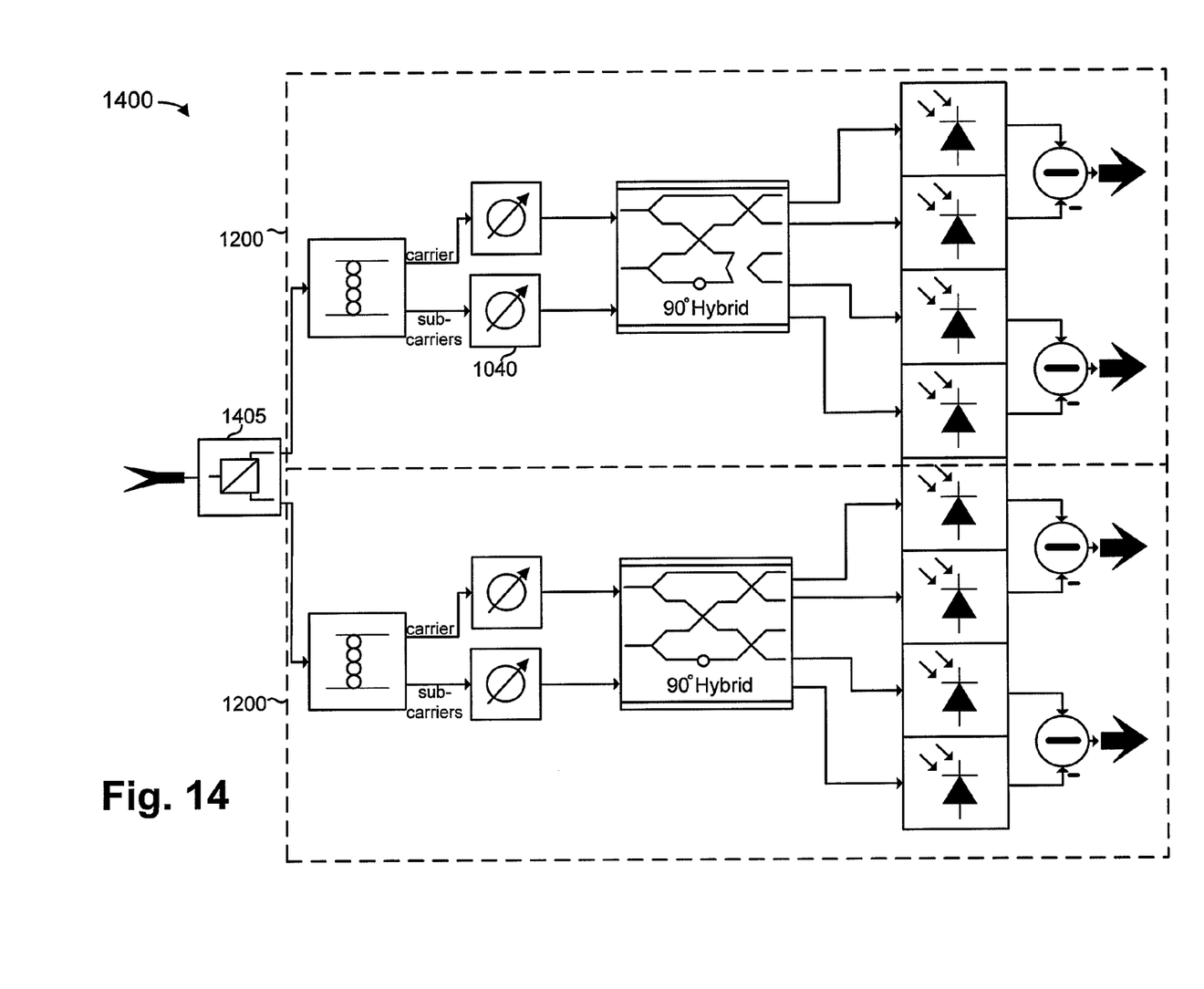
FIG. 14 is a diagram illustrating another exemplary receiver for demodulating OFDM modulated signals that contain subcarrier groups on both the right and left of the carrier.

FIG. 14 is a diagram illustrating another exemplary receiver 1400 for demodulating OFDM modulated signals that contain subcarrier groups on both the right and left of the carrier. Receiver 1400 is a polarization multiplexed receiver using a 90 degree optical hybrid component. As shown, receiver 1400 includes a polarizing beam splitter 1405 in front of two instances of receiver 1200 (FIG. 12). The output of polarizing beam splitter 1405 may be processed with receivers 1200 as described previously with respect to FIG. 12.

A polarization controller (not shown) may be used with polarizing beam splitter 1405 to align the polarization multiplexed signals to the axes of polarizing beam splitter 1405. Alternatively, receiver 1400 could be implemented without a polarization controller. In this case, the outputs of the balanced receivers may be fed into a multiple-input multiple-output (MIMO) demultiplexer to demultiplex the signals.

In one implementation, polarizing beam splitter 1405 may be implemented using PLC technology along with the other optical components shown in FIG. 14. In other implementations, other technologies could be used.

CONCLUSION

The foregoing description of embodiments described herein provides illustration and description, but is not intended to be exhaustive or to limit the embodiments described herein to the precise form disclosed. Modifications and variations are possible in light of the above teachings or may be acquired from practice of the invention.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. An optical receiver, comprising:
   an optical filter having an input and first and second outputs, the input being configured to receive an input optical signal, which includes a carrier and a plurality of subcarriers, the optical filter supplying a first output optical signal including the carrier at the first output and a second output optical signal including the plurality of subcarriers at the second output, the carrier having a first frequency, and each of the plurality of subcarriers having a corresponding one of a plurality of second frequencies;
   an optical coupler having first and second inputs and first and second outputs, the first input of the optical coupler being configured to receive the first output optical signal and the second input of the optical coupler being configured to receive the second output optical signal, a third output optical signal being supplied from the first output of the optical coupler and a fourth output optical signal being supplied from the second output of the optical coupler;
   a first photodetector configured to receive the third output optical signal and generate a first electrical signal in response to the third output optical signal; and
   a second photodetector configured to receive the fourth output optical signal and generate a second electrical signal in response to the fourth output optical signal.

2. An optical receiver in accordance with claim 1, wherein the plurality of subcarriers carry data, the optical receiver further including a circuit, the circuit being configured to receive the first and second electrical signals and output a third electrical signal, the third electrical signal carrying the data.

3. An optical receiver in accordance with claim 2, wherein the circuit includes a differential amplifier connected to receive the first electrical signal from the second electrical signal as inputs.

4. An optical receiver in accordance with claim 2, where the circuit further includes:
   an analog-to-digital converter connected to convert the third electrical signal to a digital signal; and
   a digital signal processor (DSP) for recovering the data from the digital signal.

5. An optical receiver in accordance with claim 1, further including a balanced detector circuit, the first and second photodetectors being included in the balanced detector circuit.

6. An optical receiver in accordance with claim 1, where the optical coupler generates the third output optical signal as the sum of the input signals and the fourth output optical signal as the difference between the input signals.

7. An optical receiver in accordance with claim 1, where the optical filter includes a cascaded ring narrowband filter.

8. An optical receiver in accordance with claim 1, further including a planar lightwave circuit (PLC), the PLC including the optical filter and the optical coupler.

9. An optical receiver in accordance with claim 1, further including:
   a variable optical attenuator (VOA) positioned between the optical filter and the optical coupler, the VOA configured to attenuate a portion of the second output optical signal.

10. An optical receiver in accordance with claim 9, further including:
    a second VOA positioned between the optical filter and the optical coupler, the second VOA configured to attenuate the second optical output signal.

11. An optical receiver in accordance with claim 1, further including:
    a polarization beam splitter connected to supply the input optical signal to the optical filter.

12. An optical receiver in accordance with claim 1, wherein the input optical signal has a modulation format that conforms to an Orthogonal Frequency Division Multiplexing (OFDM) modulation format.

13. A method comprising:
    receiving an optical signal that contains data, the optical signal including a carrier and a plurality of subcarriers;
    providing input fields by optically separating the carrier from the plurality of subcarriers using an optical filter that separates signals based on frequency;
    optically coupling the separated carrier and the plurality of subcarriers to obtain a first and second optical signals that are the sum and difference of the input fields;

generating an electrical signal from the first and second optical signals;

digitizing the electrical signal; and processing the digitized electrical signal to recover the data.

14. The method of claim 13, wherein the data in the received signal has a modulation format that conforms to an Orthogonal Frequency Division Multiplexing (OFDM) modulation format.

* * * * *